United States Patent
Botkin et al.

[11] Patent Number: 6,161,161
[45] Date of Patent: Dec. 12, 2000

[54] SYSTEM AND METHOD FOR COUPLING A LOCAL BUS TO A PERIPHERAL COMPONENT INTERCONNECT (PCI) BUS

[75] Inventors: Craig D. Botkin, Cedar Park; Joaquin J. Aviles; Ronald E. Battles, both of Austin, all of Tex.

[73] Assignee: Cisco Technology, Inc., San Jose, Calif.

[21] Appl. No.: 09/227,634

[22] Filed: Jan. 8, 1999

[51] Int. Cl.[7] ............................................. G06F 13/00
[52] U.S. Cl. ..................... 710/129; 710/126; 710/128
[58] Field of Search ................................. 710/129, 128, 710/126

[56] References Cited

U.S. PATENT DOCUMENTS

| | | | |
|---|---|---|---|
| 3,532,827 | 10/1970 | Ewin | 179/18 |
| 3,821,484 | 6/1974 | Sternung et al. | 179/18 EB |
| 4,002,849 | 1/1977 | Kotler et al. | 179/18 EB |
| 4,282,408 | 8/1981 | Stauers | 179/18 FA |
| 4,438,511 | 3/1984 | Baran | 370/19 |
| 4,665,514 | 5/1987 | Ching et al. | 370/60 |
| 4,679,227 | 7/1987 | Hughes-Hartogs | 379/98 |
| 4,723,267 | 2/1988 | Jones et al. | 379/93 |
| 4,731,816 | 3/1988 | Hughes-Hartogs | 379/98 |
| 4,757,495 | 7/1988 | Decker et al. | 370/76 |
| 4,782,512 | 11/1988 | Hutton | 379/98 |
| 4,833,706 | 5/1989 | Hughes-Hartogs | 379/98 |
| 4,841,561 | 6/1989 | Hill | 379/97 |
| 4,949,355 | 8/1990 | Dyke et al. | 375/10 |
| 4,980,897 | 12/1990 | Decker et al. | 375/38 |
| 5,025,469 | 6/1991 | Bingham | 379/98 |
| 5,054,034 | 10/1991 | Hughes-Hartogs | 375/8 |
| 5,119,402 | 6/1992 | Ginzburg et al. | 375/17 |
| 5,134,611 | 7/1992 | Steinka et al. | 370/79 |
| 5,185,763 | 2/1993 | Krishnan | 375/39 |
| 5,198,818 | 3/1993 | Samueli et al. | 341/144 |
| 5,199,071 | 3/1993 | Abe et al. | 379/38 |
| 5,202,884 | 4/1993 | Close et al. | 370/94.1 |
| 5,206,886 | 4/1993 | Bingham | 375/97 |
| 5,214,650 | 5/1993 | Renner et al. | 370/110.1 |
| 5,222,077 | 6/1993 | Krishnan | 375/39 |
| 5,228,062 | 7/1993 | Bingham | 375/97 |
| 5,247,347 | 9/1993 | Litteral et al. | 358/85 |
| 5,282,155 | 1/1994 | Jones | 364/724.19 |
| 5,285,474 | 2/1994 | Chow et al. | 375/13 |
| 5,293,402 | 3/1994 | Crespo et al. | 375/14 |
| 5,295,159 | 3/1994 | Kerpez | 375/38 |
| 5,331,670 | 7/1994 | Sorbara et al. | 375/111 |

(List continued on next page.)

FOREIGN PATENT DOCUMENTS

| | | |
|---|---|---|
| 62-084646 | 4/1987 | Japan . |
| 62-222755 | 9/1987 | Japan . |
| 63-76648 | 4/1988 | Japan . |
| 02271763 | 11/1990 | Japan . |
| 04100367 | 4/1992 | Japan . |
| WO 86/02796 | 5/1986 | WIPO . |
| WO 97/37458 | 10/1997 | WIPO . |

OTHER PUBLICATIONS

Horst Hessenmüller, et al., Zugangsnetzstrukturen für interaktive Videodienste (Teil 1), *Fernmelde Ingenieur*, Der, vol. 48, No. 8, XP000647017, Aug., 1994, Germany, pp. 1–32 (with English translation).

Horst Hessenmüller, et al., Zugangsnetzstrukturen für interaktive Videodienste (Teil 2), *Fernmelde–Ingenieur*, vol. 48, No. 9, XP000619688, Sep., 1994, Germany, pp. 1–28 (with English translation).

*Primary Examiner*—Ario Etienne
*Attorney, Agent, or Firm*—Baker Botts L.L.P.

[57] ABSTRACT

A system and method for coupling a local bus to a PCI bus are provided. The system comprises a local bus interface for receiving signals from a microprocessor through a local address/data bus and a local control bus. The system further comprises a bus translator coupled to the local bus interface. The bus translator determines if the microprocessor will access a target peripheral PCI device coupled to the local address/data bus. A PCI control bus interface is coupled to the bus translator and signals the target PCI peripheral device via a PCI control bus, such that the local address/data bus and the PCI control bus define a PCI bus.

25 Claims, 2 Drawing Sheets

U.S. PATENT DOCUMENTS

| | | | |
|---|---|---|---|
| 5,337,348 | 8/1994 | Yamazaki et al. | 379/94 |
| 5,339,355 | 8/1994 | Mori et al. | 379/94 |
| 5,341,474 | 8/1994 | Gelman et al. | 395/200 |
| 5,345,437 | 9/1994 | Ogawa | 370/13 |
| 5,367,540 | 11/1994 | Kakuishi et al. | 375/103 |
| 5,371,532 | 12/1994 | Gelman et al. | 348/7 |
| 5,379,444 | 1/1995 | Watanabe et al. | 395/800 |
| 5,390,239 | 2/1995 | Morris et al. | 379/93 |
| 5,400,322 | 3/1995 | Hunt et al. | 370/19 |
| 5,404,388 | 4/1995 | Eu | 379/24 |
| 5,408,260 | 4/1995 | Arnon | 348/6 |
| 5,408,522 | 4/1995 | Ikehata et al. | 379/98 |
| 5,408,614 | 4/1995 | Thornton et al. | 395/275 |
| 5,410,264 | 4/1995 | Lechleider | 327/311 |
| 5,410,343 | 4/1995 | Coddington et al. | 348/7 |
| 5,414,455 | 5/1995 | Hooper et al. | 348/7 |
| 5,414,733 | 5/1995 | Turner | 375/233 |
| 5,422,876 | 6/1995 | Turudic | 370/15 |
| 5,428,608 | 6/1995 | Freeman et al. | 370/60.1 |
| 5,430,793 | 7/1995 | Ueltzen et al. | 379/93 |
| 5,440,335 | 8/1995 | Beveridge | 348/13 |
| 5,442,390 | 8/1995 | Hooper et al. | 348/7 |
| 5,453,779 | 9/1995 | Dan et al. | 348/7 |
| 5,461,415 | 10/1995 | Wolf et al. | 348/7 |
| 5,461,616 | 10/1995 | Suzuki | 370/79 |
| 5,461,640 | 10/1995 | Gatherer | 375/231 |
| 5,469,495 | 11/1995 | Beveridge | 379/56 |
| 5,475,735 | 12/1995 | Williams et al. | 379/59 |
| 5,477,263 | 12/1995 | O'Callaghan et al. | 348/7 |
| 5,479,447 | 12/1995 | Chow et al. | 375/260 |
| 5,479,636 | 12/1995 | Vanka et al. | 711/133 |
| 5,495,483 | 2/1996 | Grube et al. | 370/95.1 |
| 5,504,736 | 4/1996 | Cubbison, Jr. | 370/13 |
| 5,504,756 | 4/1996 | Renger et al. | 371/20.1 |
| 5,506,868 | 4/1996 | Cox et al. | 375/222 |
| 5,513,251 | 4/1996 | Rochkind et al. | 379/93 |
| 5,528,585 | 6/1996 | Cooley et al. | 370/56 |
| 5,546,379 | 8/1996 | Thaweethai et al. | 370/17 |
| 5,555,244 | 9/1996 | Gupta et al. | 370/60.1 |
| 5,574,724 | 11/1996 | Bales et al. | 370/68.1 |
| 5,583,872 | 12/1996 | Albrecht et al. | 370/476 |
| 5,598,406 | 1/1997 | Albrecht et al. | 370/296 |
| 5,600,712 | 2/1997 | Hanson et al. | 379/142 |
| 5,602,902 | 2/1997 | Satterlund et al. | 379/59 |
| 5,631,897 | 5/1997 | Pacheco et al. | 370/237 |
| 5,632,021 | 5/1997 | Jennings et al. | 395/309 |
| 5,649,001 | 7/1997 | Thomas et al. | 379/93.07 |
| 5,668,857 | 9/1997 | McHale | 379/93.07 |
| 5,678,004 | 10/1997 | Thaweethai | 595/187.01 |
| 5,687,176 | 11/1997 | Wisniewski et al. | 370/476 |
| 5,737,364 | 4/1998 | Cohen et al. | 375/220 |
| 5,751,710 | 5/1998 | Crowther et al. | 370/423 |
| 5,756,280 | 5/1998 | Soora et al. | 455/4.2 |
| 5,770,950 | 6/1998 | Zurcher et al. | 326/30 |
| 5,781,617 | 7/1998 | McHale et al. | 379/93.14 |
| 5,790,831 | 8/1998 | Lin et al. | 395/500 |
| 5,793,987 | 8/1998 | Quackenbush et al. | 395/280 |
| 5,799,017 | 8/1998 | Gupta et al. | 370/419 |
| 5,812,786 | 9/1998 | Seazholtz et al. | 395/200.63 |
| 5,852,655 | 12/1998 | McHale et al. | 379/93.14 |
| 5,953,511 | 9/1999 | Sescila, III et al. | 710/129 |

SYSTEM AND METHOD FOR COUPLING A LOCAL BUS TO A PERIPHERAL COMPONENT INTERCONNECT (PCI) BUS

TECHNICAL FIELD OF THE INVENTION

The present invention relates in general to peripheral component interconnect (PCI) bus systems and, more particularly, to a system and method for coupling a local bus to a PCI bus.

BACKGROUND OF THE INVENTION

The Peripheral component interconnect (PCI) bus is a bus standard developed to enable applications to transfer data between a microprocessor bus, also called a local bus, and peripheral devices. The current PCI standard uses a 32-bit data path, a 33 MHZ clock speed and a maximum data transfer rate of 132 MB/sec. A 64-bit specification exists for future PCI designs, which will double data transfer performance to 264 MB/sec.

Conventional applications employ the PCI bus in a bridged architecture. A PCI bridge architecture uses a de-ccupling bridge to isolate the local bus from the PCI bus. The microprocessor writes data to a target PCI peripheral by first writing the data to the PCI bridge, and the PCI bridge moves the data to the target PCI peripheral (data is obtained from a PCI peripheral in a similar manner, but in the opposite direction). One advantage of the bridged architecture is that it allows the microprocessor to perform its next operation rather than waiting for the transfer to complete, and the buffer in the PCI bridge feeds the data to the target peripheral at the most efficient rate possible.

The use of a PCI bridge in a conventional bridged architecture, however, also entails disadvantages. Most conventional PCI bridges use complex translation methods or schemes such as FIFO buffering, data prefetching, and coherence, which increases system complexity and lead to higher cost applications. Additionally, such schemes increase data latency, making applications more difficult to design and trouble-shoot.

One application employing this conventional bridged architecture in a PCI based system is an asynchronous digital subscriber line (ADSL) router. In a conventional ADSL router, an ADSL bit pump couples to an "off the shelf" segmentation and reassembly (SAR) chip, which in turn is coupled to a PCI bus as a PCI device. The PCI bus provides access to a local bus through a PCI bridge, such that a microprocessor can access the SAR as a target PCI device. Another peripheral device on the PCI bus may be a connectivity device, such as an Ethernet 10/100 interface.

Such conventional routers have disadvantages. The bridged architecture leads to higher application cost and a more difficult application to design and trouble-shoot, as discussed above. Additionally, the "off the shelf" SAR silicon are usually designed to provide access to 155 Mbit/sec ATM networks. Such performance is not necessary for the slower speed ADSL applications, which require transfer rates of about 10 Mbit/sec. Such over-design, once again, leads to higher application cost.

SUMMARY OF THE INVENTION

In accordance with the present invention, a system and method for coupling a local bus to a PCI bus is disclosed that provides significant advantages over a conventional PCI bridge architecture.

According to one aspect of the present invention, a system comprises a local bus interface for receiving signals from a microprocessor through a local address/data bus and a local control bus. The system further comprises a bus translator coupled to the local bus interface. The bus translator determines if the microprocessor will access a target peripheral PCI device coupled to the local address/data bus. A PCI control bus interface is coupled to the bus translator and signals the target PCI peripheral device via a PCI control bus, such that the local address/data bus and the PCI control bus define a PCI bus.

According to another aspect of the present invention, a method for coupling a local bus to a PCI bus comprises receiving signals from a microprocessor through a local address/data bus and a local control bus. It is determined if the microprocessor will access a target PCI peripheral device coupled to the local address/data bus. The target PCI peripheral device is signaled via a PCI control bus, such that the local address/data bus and the PCI control bus collectively form a PCI bus.

It is a technical advantage of the present invention that it sharply reduces the need for local bus to PCI bus translation methods or buffering schemes, which decreases system complexity and leads to lower system cost.

It is another technical advantage that data latency is reduced or eliminated, leading to easier system design and trouble-shooting.

It is a further technical advantage of the present invention that it allows for the integration of a PCI device with the system that couples the local bus to the PCI bus. This allows for a SAR design more suited to ADSL needs which decreases system cost of an ADSL router.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
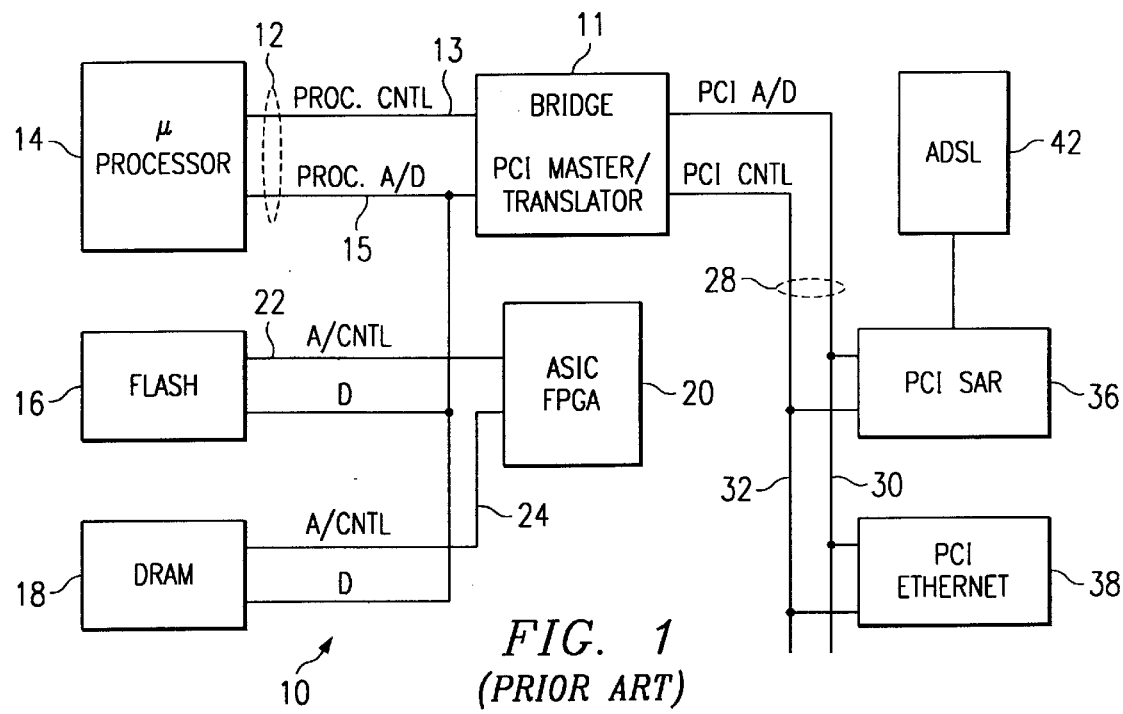
FIG. 1 is a block diagram of a conventional PCI based system using a de-coupling bridge.

FIG. 1 is a block diagram of a conventional PCI based system using a de-coupling bridge. A bridge system, indicated generally at 10, could be used, for example, as a conventional ADSL router.

A PCI bridge 11 is coupled to a local bus 12 of a microprocessor 14. Local bus 12 comprises a local control bus 13 and a local address/data bus 15. A flash memory 16 and a DRAM memory 18 are also coupled to local address/data bus 15. A memory ASIC 20 is coupled to flash memory 16 and DRAM memory 18 through a flash address/control bus 22 and a DRAM address/control bus 24.

PCI peripherals can couple to PCI bridge 11 via a PCI bus 28. PCI bus 28 includes PCI address/data bus 30 and PCI control bus 32. In bridge system 10, the PCI peripheral devices coupled to PCI bus 28 are a segmentation and reassembly engine (SAR) 36 and an Ethernet gateway 38. An ADSL gateway 42 is coupled to SAR 36.

In operation, bridge system 10 can be used as an ADSL router. ADSL gateway 42 receives ADSL traffic and passes it to SAR 36. SAR 36 segments and reassembles the traffic and provides it to microprocessor 14 via PCI bridge 11. Microprocessor 14 performs required manipulation of the traffic and then passes it out to Ethernet gateway 38, once again via PCI bridge 11.

Access by microprocessor 14 to PCI peripherals, such as SAR 36 and Ethernet gateway 38, is bridged by PCI bridge 11. For example, in order for microprocessor 14 to access SAR 36, PCI bridge 10 interprets the command and address issued on local bus 12. Then, PCI bridge 11 gains access to the PCI bus 28 and completes the access. Such a scheme allows microprocessor 14 to resume other tasks while PCI bridge 11 completes the access. However, conventional PCI bridges 11 employ complex translation methods or schemes such as FIFO buffering, data prefetching, and coherence. Such a scheme leads to data latency problems, making system design more expensive and difficult to troubleshoot.

Further in operation, microprocessor 14 makes accesses to flash memory 16 and DRAM memory 18. Microprocessor 14 reads data from or writes data to these devices via processor address/data bus 15. However, addressing and control for the two memory types must come from memory ASIC 20. Such a design leads to higher cost because of the additional chip and additional pin counts.

Figure 2:
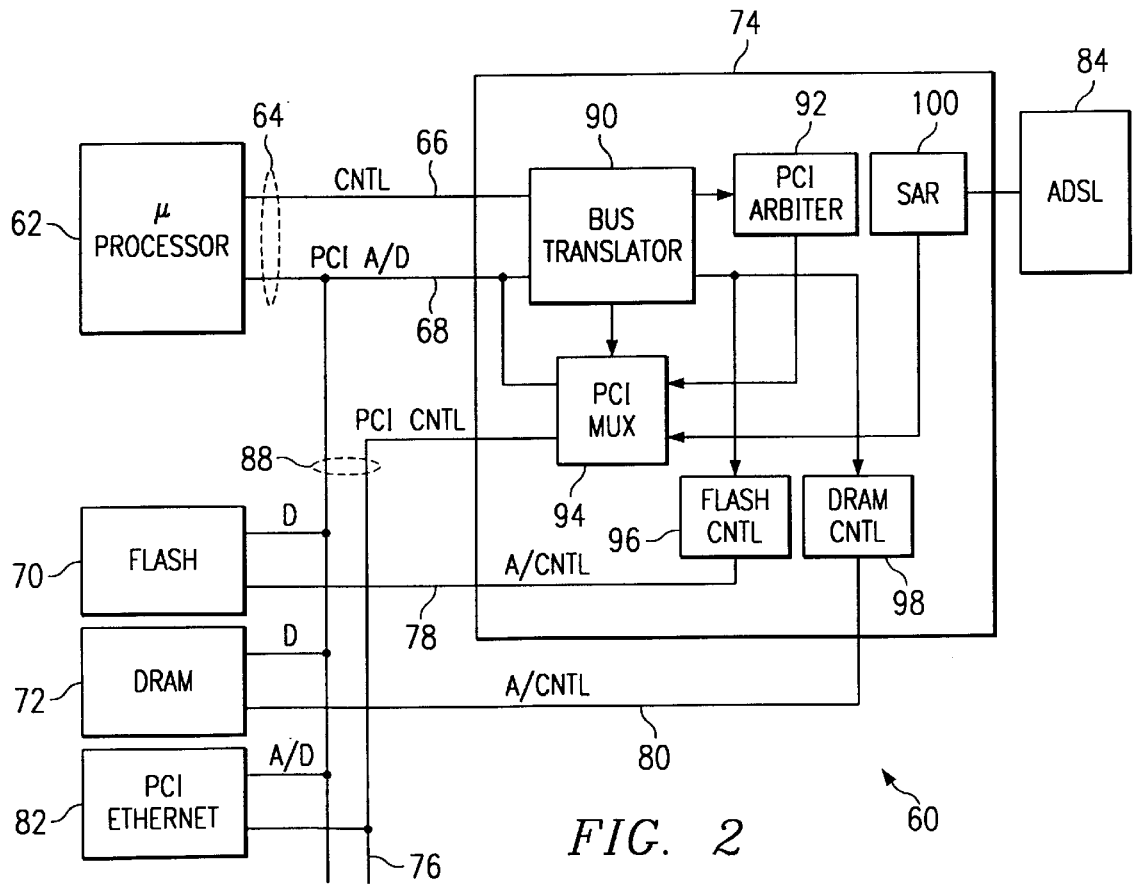
FIG. 2 is a block diagram of one embodiment of an ADSL router using a system for coupling a local bus to a PCI bus.

FIG. 2 is a block diagram of one embodiment of an ADSL router using a system for coupling a local bus to a PCI bus. Although the present invention is discussed with respect to an ADSL router, those skilled in the art will recognize that the invention has applicability to other applications that require communication between a local bus and a PCI bus.

An ADSL router, indicated generally at 60, includes a microprocessor 62. Microprocessor 62 can comprise, for example, an INTEL I960 or PENTIUM processor, a MOTOROLA 68xxxx processor, an AMD 29K processor, other processor type. A local control bus 66 and a local address/data bus 68 together comprise a local bus 64 which is coupled to microprocessor 62. Similar to the conventional system of FIG. 1, a flash memory 70 and a DRAM memory 72 are coupled to local address/data bus 68.

A system 74 is coupled to local bus 64, and is the basis of the present invention. System 74 is also coupled to a PCI control bus 76, a flash address/control bus 78, and a DRAM address/control bus 80. A PCI peripheral device, such as Ethernet interface 82 can couple to local address/data bus 68 and PCI control bus 76. An ADSL interface 84 is coupled to system 74.

In the embodiment of FIG. 2, system 74 comprises a bus translator 90 coupled to local bus 64. Bus translator 90 can interface with local bus 64 through, for example, a local bus interface such as pins or wires. Bus translator 90 is also coupled to a PCI arbitrator 92, a multiplexer 94, a flash memory controller 96, and a DRAM controller 98. PCI arbitrator 92 is also coupled to a multiplexer 94. Flash memory controller 96 is coupled to flash address/control bus 78, and DRAM controller 98 is coupled to DRAM address/control bus 80. System 74 interfaces with PCI bus 88 by a PCI bus interface coupled to bus translator 90. For example, in the embodiment of FIG. 2, such an interface comprises multiplexer 94. Alternately, PCI bus interface may comprise pins or wires, meaning there is no intermediate process between bus translator 90 and PCI bus 88.

System 74 further comprises SAR engine 100, which is coupled to ADSL interface 84 and multiplexer 94. Multiplexer 94, in turn, is further coupled to local address/data bus 68 and PCI control bus 76.

In operation, system 74 is operable to receive signals from microprocessor 62 on local bus 64. System 74 can further determine if microprocessor 62 will access a target PCI peripheral device, such as Ethernet interface 82, that is coupled to local address/data bus 68. System 74 signals the target of the intended access via PCI control bus 76. In such a way, system 74 uses local address/data bus 68 and PCI control bus 76 to form a PCI bus 88.

Further in operation, system 74 can support PCI peripheral devices that are internal to system 74. For example, in the embodiment of FIG. 2, SAR engine 100 is internal to system 74, yet is configured as a PCI peripheral device. Microprocessor 62 performs accesses to SAR engine 100 similar to accesses performed to other PCI peripheral devices.

Multiplexer 94 allows access to PCI bus 88 by bus translator 90 and SAR engine 100, PCI arbitrator 92 arbitrates control of PCI bus 88.

Additionally in operation, system 74 can control access by microprocessor 62 to flash memory 70 and DRAM memory 72 through flash memory controller 96 and DRAM controller 98, respectively. For example, flash memory controller 96 and DRAM controller 98 could provide the appropriate address and control signals to flash memory 70 and DRAM 72 in order to support single cycle or burst access by microprocessor 62. In such a manner, device 74 can replace the functionality of memory ASIC 20 of FIG. 1.

Figure 3:
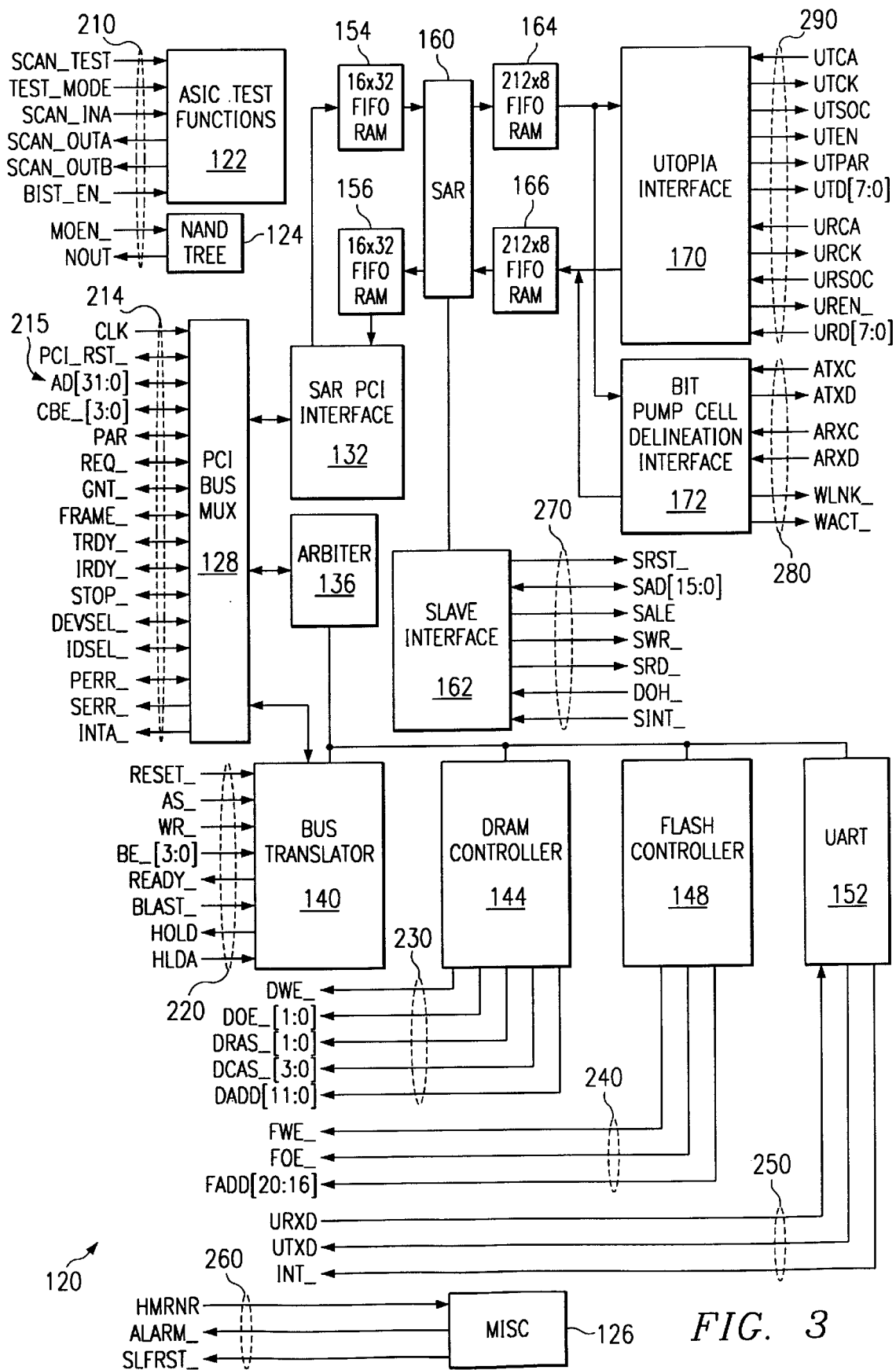
FIG. 3 is a block diagram of one embodiment of an ASIC for use as a system for coupling a local bus to a PCI bus.

FIG. 3 is a block diagram of one embodiment of an ASIC for use as a system for coupling a local bus to a PCI bus. In the embodiment of FIG. 3, ASIC, indicated generally at 120, comprises the functionality of the embodiment of FIG. 2 as well as additional functionality. Further in this embodiment, it is assumed that microprocessor 62 of FIG. 2 comprises an INTEL I960 processor. Those skilled in the art, however, will recognize that the invention contemplates embodiments that interface with other makes of processors, and the following discussion of operability is adaptable to such other processors. ASIC 120 can comprise, for example, the SMPLSAR ASIC, part no. 08-0259-01, manufactured by CISCO SYSTEMS, INC.

ASIC 120 comprises ASIC test functions 122, NAND tree 124, and miscellaneous 126, for the provision of generic functionality to ASIC 120.

ASIC 120 further comprises PCI bus MUX (multiplexer) 128 which is coupled to SAR PCI interface 132, arbiter 136, and bus translator 140. Further coupled to arbiter 136 and bus translator 140 are DRAM controller 144, flash controller 148, and UART 152.

Coupled to SAR PCI interface 132 are two sets of memory 154, 156, which in turn are coupled to SAR 160. Memory 154, 156 can comprise, for example 16×32 RAM. A slave interface 162 and two further sets of memory 164, 166 are coupled to SAR 160. Memory 164, 166 can comprise, for example 212×8 RAM. Coupled to memory 164, 166 are utopia interface 170 and bit pump cell delineation interface 172.

Also shown in FIG. 3 are the signals that transmit to from ASIC 120 and comprise the various busses coupled to ASIC 120. Test signals 210 couple to ASIC test function 122 and NAND tree 124. Test signals 210 can be used, for example, to test functionality of ASIC 120. Miscellaneous signals 260 are coupled to miscellaneous 126.

PCI bus 214 is coupled to PCI bus MUX 128 and is comprised of the signals shown. AD 215 comprises the address/data bus used for the transmission of data by the I960 processor and PCI peripheral devices coupled to PCI bus 214. In other words, AD 215 comprises local address/data bus 68 of FIG. 2.

Control bus 220 is coupled to bus translator 140 and comprise signals for the operation and interaction between the I960 processor and ASIC 120. DRAM address/control bus 230, flash address/control bus 240, and UART control bus 250 couple to DRAM controller 144, flash controller 148, and UART controller 152, respectively and provide for the operation of each of the above.

Slave signals 270 couple to slave interface 162 and provide for access to an external slave peripheral, such as ADSL interface 84 of FIG. 2. Bit pump signals 280 couple to bit pump 172, and utopia signals 290 couple to utopia interface 170 and provide for the interface of SAR 160 to a utopia bus.

In operation, ASIC 120 is operable to perform as system 74 of FIG. 2. Specifically, ASIC 120 is operable to be coupled to a local address/data bus, a local control bus, and a PCI control bus. ASIC 120 can further receive signals from an I960 processor coupled to the local address/data bus and the local control bus. ASIC 120 can further determine if the I960 intends to access a target PCI peripheral device which is also coupled to the local address/data bus, and signal such target PCI peripheral on the PCI control bus. ASIC 120 thus forms a PCI bus out of the local address/data bus and the PCI control bus. In the embodiment of FIG. 3, the signals indicated comprise PCI bus 214 and local control bus 220, and AD 215 forms the local address/data bus.

In the I960 based system of FIG. 3, all PCI peripheral devices reside on PCI bus 214 or are internal to ASIC 120. Additionally, only the I960 and ASIC 120 use local control bus 220. In this type of system, AD 215 is a multiplexed bus wherein the I960 shares the same pins with the multiplexed address/data PCI bus. The I960 is the master of this shared bus whenever the HLDA signal on the local control bus is inactive. As a master of AD 215, the I960 performs standard cycles to PCI targets (including SAR 160 internal to ASIC 120), PCI configuration cycles to PCI targets (including the internal SAR), and single and burst cycles to the DRAM (72 of FIG. 2) and Flash EEPROM (70 of FIG. 2), that share AD 215.

The following discusses a specific implementation of one embodiment of the present invention with respect to I960 cycles and configuration cycles to PCI targets. The PCI REFERENCE GUIDE 2.1 can provide further detail into the operation of the PCI bus.

I960 Standard Cycles to PCI Targets At the beginning of a bus cycle, the I960 activates AS__ on local control bus 220 and drives AD 215 with the beginning address of the transaction. This is the address phase of the transaction. Bus translator 140 drives FRAME__ active on PCI bus 214, indicating that a PCI transaction is simultaneously occurring along with the I960 transaction. Bus translator 140 also decodes WR__ from local control bus 220 and drives CBE__ on PCI Bus 214 to indicate a PCI Bus memory read or memory write cycle (PCI Command Memory Read: CBE=6, PCI Command Memory Write: CBE=7). Since the I960 has placed the address on AD 215 with the activation of AS__, a target PCI peripheral device will be able to decode this address, since FRAME__ is active. BE__ is also driven during this cycle to indicate which data bytes are to be valid.

On the next rising edge of CLK on PCI bus 214, the I960 tristates AD 215 if the current cycle is to be a read transaction from the target. If the current transaction is a write transaction, the I960 will place the valid data on AD 215. AS__ is then taken inactive by the I960, and bus translator 140 then drives FRAME__ on PCI bus 214 inactive. The I960 drives BLAST__ on local control bus 220 active, because, in the embodiment of FIG. 3, the I960 performs only single cycles to PCI targets. Bus translator 140 drives IRDY__ active on PCI bus 214 on this clock indicating to PCI target devices that the I960 is not inserting any wait states into the cycle and is immediately ready for data. Bus translator 140 drives CBE__ on PCI bus 214 with the value being driven on BE__ bus by the I960 to indicate which bytes are valid for this transaction. Bus translator 140 further drives PAR on PCI bus 214 during this cycle to indicate the parity across the address on AD 215 CBE__ command from the previous cycle. Bus translator 140 drives PAR in subsequent CLK cycles for write transactions and tristates PAR for read transactions.

A PCI target device has up to four clocks to respond to the address of the transaction after the address phase. A PCI target responds by asserting DEVSEL__ on PCI bus 214. If by the fifth clock no PCI target has responded with the assertion of DEVSEL__, bus translator 140 will drive AD 215 bus with all ones, deassert IRDY__ on PCI bus 214, and assert READY__ on local control bus 220 to the I960 to indicate the end of the transaction. The I960 code can use this feature to test the addressing and presence of up to four possible PCI targets on PCI bus 214.

With or after the assertion of DEVSEL__, the PCI target normally terminates the transaction with the assertion of STOP__ or TRDY__ on PCI bus 214. If TRDY__ is asserted, bus translator 140 asserts READY__ on local control bus 220 to the I960 to indicate the end of the transaction. On the rising edge of CLK after the assertion of TRDY__, bus translator 140 will deassert IRDY__ on PCI bus 214 and the data on AD 215 will be sampled by the PCI target for write cycles or sampled by the I960 for read cycles. This is the normal termination of I960 standard cycles to PCI targets. There is one clock between the assertion of READY__ by bus translator 140 and the next I960 cycle that begins with the assertion of AS__ by the I960.

If a PCI target terminates a transaction with the activation of STOP__ without TRDY__ on PCI bus 214, then bus translator 140 deasserts IRDY__ and takes control of PCI bus 214 to complete the cycle. For I960 read cycles, the bus translator 140 keeps the I960 holding by not asserting READY__ on local control bus 220. On the next CLK, bus translator 140 drives the previously sampled beginning address for the transaction back onto AD 215 (AD 215 is still tristated since it is a read cycle), drives CBE__ with a read command, and asserts FRAME__ active to restart the PCI read transaction. The PCI cycle then continues as if initiated by the I960. If the transaction is once again terminated with a STOP__ without TRDY__ on the PCI bus, bus translator 140 continues to retry the transaction with new FRAME__ cycles on PCI bus 214 until the cycle is finally terminated with the assertion of TRDY__ on PCI bus 214 by the target PCI device. Upon such an event, bus translator 140 will drive READY__ on local control bus 220 to the I960, terminating the cycle.

For I960 write cycles, where a PCI target terminates a transaction with the activation of STOP__ without TRDY__, bus translator 140 latches the data on AD 215 bus and drives READY__ on local control bus 220 active to the I960, which terminates the cycle. Bus translator 140 also drives HOLD on local control bus 220 active, which in turn forces the I960 to respond by asserting HDLA on the next clock, preventing the I960 from performing any more cycles. Bus translator 140 takes control of PCI bus 214 and performs write transactions using the address and data latched from the initial I960 write cycle. PCI write transactions are performed until terminated by the assertion of TRDY_. On the clock after TRDY_ is asserted, bus translator 140 releases HOLD which allows the I960 to begin another transaction.

I960 Configuration Cycles to PCI Targets

A PCI configuration cycle is signaled to a PCI target with the assertion of the IDSEL on PCI bus 214 to that PCI target. Each PCI target has a separate IDSEL input. The embodiment of FIG. 3 provides IDSEL signals for up to four PCI targets. One of these targets is SAR 160, internal to ASIC 120. The remaining three PCI targets are coupled to the IDSEL, PERR_, and SERR_ outputs of ASIC 120 on PCI bus 214.

To perform a PCI configuration cycle to a selected PCI target, the I960 must indicate to ASIC 120, such that bus translator 140 can drive the appropriate IDSL signal. For example, the I960 could write to a system control register of ASIC 120. The I960 can then perform an access to the PCI target which will be converted into a PCI configuration cycle. The PCI configuration cycle is the same as a normal cycle with the exception of the value driven onto the CBE_ on PCI bus 128 during the address phase of the cycle. (CBE_=A for configuration read cycles and CBE_=B for configuration write cycles.) To end configuration cycles, the I960 can write to the System Control Register to reset the IDSEL outputs.

It is a technical advantage of the present invention that data latency can be reduced or eliminated due to the sharing of the local address/data bus by the microprocessor and the PCI peripheral devicds. It is a fur-her technical advantage of the present invention that a PCI peripheral device can be integrated into the solution. For example, ASIC 120 of FIG. 3 includes SAR 160 configured as a PCI peripheral device. SAR 160 can then be designed to meet the demands of a particular application, for example an ADSL router.

The present invention can be used in a variety of applications, such as an ADSL/ATM NIC adapter and an I960 based Ethernet to ATM/ADSL routers. Other applications include ATM25 Mbit NIC adapters, multi ADSL Ethernet routers (one device in a standard Ethernet to ATM/ADSL router configuration with an additional two devices on the PCI bus for an additional two ADSL bit pumps), I960 based ATM/ADSL to MPEG/VGA/NTSC set top box, or to connect the I960 to any other merchant PCI silicon or PCI adapters.

Although the present invention has been described in detail, it should be understood that various changes, substitutions and alterations can be made thereto without departing from the spirit and scope of the invention as defined by the appended claims.

What is claimed is:

1. A system for coupling a local bus to a PCI bus, comprising:
   a local bus interface for receiving signals from a microprocessor through a local address/data bus and a local control bus;
   a bus translator coupled to the local bus interface for determining if the microprocessor will access a target peripheral PCI device coupled to the local address/data bus; and
   a PCI control bus interface coupled to the bus translator, the PCI control bus interface for signaling the target PCI peripheral device via a PCI control bus;
   such that the local address/data bus and the PCI control bus define a PCI bus.

2. The system of claim 1, wherein the bus translator comprises an ASIC.

3. The system of claim 1 further comprising:
   a DRAM controller coupled to the bus translator, a DRAM address bus, and a DRAM control bus;
   wherein the bus translator is operable to determine if the microprocessor intends to access a DRAM memory coupled to the local address/data bus, and wherein the bus translator is further operable to signal the DRAM memory via the DRAM address bus and the DRAM control bus.

4. The system of claim 1, further comprising:
   a flash memory controller coupled to the bus translator, a flash memory address bus, and a flash memory control bus;
   wherein the bus translator is operable to determine if the microprocessor intends to access a flash memory coupled to the local address/data bus, and wherein the bus translator is further operable to signal the flash memory via the flash memory address bus and the flash memory control bus.

5. The system of claim 1, wherein the target PCI peripheral device comprises a segmentation and reassembly engine.

6. The system of claim 1, wherein the target PCI peripheral device comprises a PCI Ethernet interface.

7. The system of claim 1, further comprising:
   a multiplexer coupled between the bus translator and the PCI bus;
   a second PCI peripheral device coupled to the multiplexer, the second PCI peripheral device operable to access the PCI bus; and
   a PCI arbitrator coupled to the bus translator and the multiplexer for arbitrating control of the PCI bus.

8. The system of claim 7, wherein the second PCI peripheral device comprises a segmentation and reassembly engine.

9. The system of claim 7, wherein the bus translator, the DRAM controller, the flash controller, the multiplexer, the second PCI peripheral device, and the PCI arbitrator are integrated into an ASIC.

10. A system for coupling a local bus to a PCI bus, comprising:
    a local bus interface for receiving signals from a microprocessor through a local address/data bus and a local control bus;
    a bus translator coupled to the local bus interface, the bus translator for determining if the microprocessor will access a target PCI peripheral device coupled to the local address/data bus; and
    a PCI bus interface coupled to the bus translator, the PCI bus interface for signaling the target PCI peripheral device via a PCI control bus such that the local address/data bus and the PCI control bus collectively form a PCI bus;
    a DRAM controller coupled to the bus translator, a DRAM address bus, and a DRAM control bus;
    a flash memory controller coupled to the bus translator, a flash memory address bus, and a flash memory control bus;
    a multiplexer coupled between the bus translator and the PCI bus;
    a second PCI peripheral device coupled to the multiplexer, the second PCI peripheral device operable to access the PCI bus; and a PCI arbitrator coupled to the bus translator and the multiplexer for arbitrating control of the PCI bus.

11. The system of claim 10, wherein the second PCI peripheral device comprises a segmentation and reassembly engine.

12. The system of claim 10, wherein the target PCI peripheral device comprises a PCI Ethernet interface.

13. The system of claim 10, wherein the bus translator, the DRAM controller, the flash controller, the multiplexer, the second PCI peripheral device, and the PCI arbitrator are integrated into an ASIC.

14. A router using a system for coupling a local bus to a PCI bus, comprising:

a microprocessor coupled to a local control bus and a local address/data bus;

a PCI peripheral device coupled to the local control bus, the local address/data bus, and a PCI control bus; and a bus translator coupled to the local address/data bus, the local control bus, and the PCI control bus, the bus translator for receiving signals from the microprocessor and determining if the microprocessor will access the PCI peripheral device, the bus translator further for signaling the PCI peripheral device via the PCI control bus;

such that the local address/data bus and the PCI control bus collectively form a PCI bus.

15. The router of claim 14, wherein the bus translator comprises an ASIC.

16. The router of claim 14, further comprising a DRAM controller coupled to the bus translator, a DRAM address bus, and a DRAM control bus;

wherein the bus translator is operable to determine if the microprocessor intends to access a DRAM memory coupled to the local address/data bus, and wherein the bus translator is further operable to signal the DRAM memory via the DRAM address bus and the DRAM control bus.

17. The router of claim 14, further comprising:

a flash memory controller coupled to the bus translator, a flash memory address bus, and a flash memory control bus;

wherein the bus translator is operable to determine if the microprocessor intends to access a flash memory coupled to the local address/data bus, and wherein the bus translator is further operable to signal the flash memory via the flash memory address bus and the flash memory control bus.

18. The router of claim 14, wherein the target PCI peripheral device comprises a segmentation and reassembly engine.

19. The router of claim 14, wherein the target PCI peripheral device comprises a PCI Ethernet interface.

20. The router of claim 14, further comprising:

a multiplexer coupled between the bus translator and the PCI bus;

a second PCI peripheral device coupled to the multiplexer, the second PCI peripheral device operable to access the PCI bus; and a PCI arbitrator coupled to the bus translator and the multiplexer for arbitrating control of the PCI bus.

21. The router of claim 20, wherein the second PCI peripheral device comprises a segmentation and reassembly engine.

22. The router of claim 20, wherein the bus translator, the DRAM controller, the flash controller, the multiplexer, the second PCI peripheral device, and the PCI arbitrator are integrated into an ASIC.

23. A method for coupling a local bus to a PCI bus, comprising:

receiving signals from a microprocessor through a local address/data bus and a local control bus;

determining if the microprocessor will access a target PCI peripheral device coupled to the local address/data bus; and signaling the target PCI peripheral device via a PCI control bus;

such that the local address/data bus and the PCI control bus collectively form a PCI bus.

24. The method of claim 23, further comprising:

determining if the microprocessor intends to access a DRAM memory coupled to the local address/data bus; and signaling the DRAM memory via a DRAM address bus and a DRAM control bus.

25. The method of claim 23, further comprising:

determining if the microprocessor intends to access a flash memory coupled to the local address/data bus;

signaling the flash memory via a flash memory address bus and a flash memory control bus.

* * * * *